United States Patent [19]

Noguchi

[11] Patent Number: 5,030,317

[45] Date of Patent: Jul. 9, 1991

[54] METHOD OF MANUFACTURING LIQUID JET RECORDING HEAD

[75] Inventor: Hiromichi Noguchi, Atsugi, Japan

[73] Assignee: Canon Kabushiki Kaisha, Tokyo, Japan

[21] Appl. No.: 500,094

[22] Filed: Mar. 21, 1990

Related U.S. Application Data

[63] Continuation of Ser. No. 38,766, Apr. 15, 1987, abandoned.

[30] Foreign Application Priority Data

Apr. 28, 1986 [JP] Japan ................................ 61-96932

[51] Int. Cl.[5] ........................ B44C 1/22; B29C 37/00; B32B 31/00

[52] U.S. Cl. ................................ 156/630; 156/273.5; 156/643; 156/655; 156/668

[58] Field of Search .................. 156/275.5, 273.5, 630, 156/655, 629, 668, 645, 639, 643, 651, 652, 656, 637; 346/140 PD, 140 R, 140 A; 430/312, 319, 320, 328, 329, 325

[56] References Cited

U.S. PATENT DOCUMENTS

| | | | |
|---|---|---|---|
| 4,412,224 | 10/1983 | Sugitani et al. | 346/140 PD |
| 4,521,787 | 6/1985 | Yokota et al. | 346/140 PD |
| 4,635,077 | 1/1987 | Itoh | 346/140 PD |
| 4,657,631 | 4/1987 | Noguchi | 156/272.2 X |
| 4,666,823 | 5/1987 | Yokota et al. | 430/328 |
| 4,670,297 | 6/1987 | Lee et al. | 430/312 |
| 4,775,445 | 10/1988 | Noguchi | 156/272.2 X |

FOREIGN PATENT DOCUMENTS

| | | | |
|---|---|---|---|
| 115355 | 7/1982 | Japan | 346/140 PD |
| 122 | 1/1983 | Japan | 430/312 |

*Primary Examiner*—David A. Simmons
*Assistant Examiner*—Chester T. Barry
*Attorney, Agent, or Firm*—Fitzpatrick, Cella, Harper & Scinto

[57] ABSTRACT

A method of manufacturing a liquid jet recording head using first and second substrates in which at least one of said substrates can transmit an active energy beam, said method comprising the steps of:

(1) laminating a solid layer onto at least a liquid channel forming portion on the first substrate;

(2) forming a laminate which is constituted by sequentially laminating said first substrate, an active energy beam hardening material layer which covers said solid layer, and the second substrate;

(3) laminating a mask adapted to shield said liquid chamber forming portion against the active energy beam onto said active energy beam transmitting substrate of said laminate and thereafter, irradiating the active energy beam from above the mask, and thereby hardening the active energy beam hardening material layer in said irradiated portion; and (4) removing the solid layer and the active energy beam hardening material layer in the unhardened state.

42 Claims, 6 Drawing Sheets

METHOD OF MANUFACTURING LIQUID JET RECORDING HEAD

This application is a continuation of application Ser. No. 038.766, filed Apr. 15, 1987 now abandoned.

BACKGROUND OF THE INVENTION

1. Field of the Invention

The present invention relates to a method of manufacturing a liquid jet recording head for generating a recording liquid droplet in an ink jet recording system.

2. Related Background Art

The liquid jet recording head for use in the ink jet recording system (liquid jet recording system), in general, comprises: a fine recording liquid emitting port (hereinafter, referred to as an orifice); a liquid channel; and a liquid emission energy generating section which is provided in the liquid channel. Hitherto, as a method of manufacturing such a liquid jet recording head, there has been known a method whereby, for example, a plate made of glass, metal, or the like is used and a fine groove is formed by working means such as cutting, etching, or the like and thereafter, the plate having the groove is joined to another proper plate to form a liquid channel.

However, the liquid jet recording head produced by such conventional method has problems such that the roughness of the surface of the inner wall of the liquid channel which was cut and worked is too large, a distortion occurs in the liquid channel due to the difference in etching ratios, it is difficult to obtain the liquid channel having a constant channel resistance, and a variation easily occurs in the recording liquid emitting characteristics of the liquid jet recording heads so manufactured. In addition, there are also such drawbacks that a notch or a crack can easily occur in the plate during the cutting work and so, the manufacturing yield is low. On the other hand, in the case of performing the etching work, there are disadvantages such that a number of manufacturing steps are required and the manufacturing cost increases. Further, as common drawbacks in the foregoing conventional methods, there are also problems such that when the plate having the groove formed with the liquid channel is stuck with a cover plate provided with a driving element such as piezoelectric element, electrothermal transducer, or the like for generating an emitting energy adapted to emit a recording liquid droplet, it is difficult to accurately position these plates and the mass productivity is low.

On the other hand, during ordinary use, the liquid jet recording head is always in contact with a recording liquid (in general, an ink liquid which mainly contains the water and is not neutral in general, or an ink liquid mainly containing an organic solvent, or the like). Therefore, as a head structural material constituting the liquid jet recording head, it is desirable to use a material which will not deteriorate due to the influence by the recording liquid and which will not effect the recording component in the recording liquid. However, in the foregoing conventional methods, since there are limitations of working methods and the like, a material which satisfies those purposes cannot be necessarily selected.

To solve the foregoing problems of the conventional methods, the applicant of the present invention has already proposed a method of manufacturing a liquid jet recording head using an active energy beam hardening material as a material to constitute a channel in Japanese Patent Application No. 274689/1984.

However, this method is not always satisfactory since the liquid channel is freely designed with respect to the size, height, and the like of the liquid chamber communicating with such liquid channel. In particular, in the case of a multiarray type liquid jet recording head such that the orifice and the liquid channel communicating therewith are highly densely arranged and the recording liquid is simultaneously emitted so as to cover the whole width of a recording paper, it is important to enlarge the volume of the liquid chamber in order to increase the liquid supply speed and to stably and uniformly emit the recording liquid. It is highly desired to develop a head manufacturing method suitable for the mass production of liquid jet recording heads of such a high density multiarray type.

SUMMARY OF THE INVENTION

It is an object of the present invention to provide a method of manufacturing a new liquid jet recording head which satisfies such requirements.

Another object of the invention is to provide a method of manufacturing a new liquid jet recording head which can supply such a liquid jet recording head that a liquid chamber can be freely formed, the cost is low and the accuracy and the reliability are also high.

Still another object of the invention is to provide a method a manufacturing a new liquid jet recording head which can supply a liquid jet recording head having such a construction that a liquid channel is accurately, correctly, and finely worked with a good yield.

Still another object of the invention is to provide a method of manufacturing a new liquid jet recording head which can supply such a liquid jet recording head that the influence between the recording head and a recording liquid is small and the mechanical strength and chemical resistance are high.

BRIEF DESCRIPTION OF THE DRAWINGS

FIGS. 1 to 7 are diagrammatical views for explaining a fundamental constitution of the present invention, in which:

FIG. 1 is a diagrammatical perspective view of the first substrate before a solid layer is formed;

FIGS. 6(A) and 6(B) are diagrammatical cross sectional views of the laminate after the solid layer and the active energy beam hardening material were removed; and FIG. 7 is a diagrammatical perspective view of a liquid jet recording head in the completed state.

In FIGS. 3 to 6, each diagram (A) is a cross sectional view taken at the position corresponding to the line A–A′ in FIG. 2 and each diagram (B) is a cross sectional view taken at the position corresponding to the line B–B' in FIG. 2.

DETAILED DESCRIPTION OF THE PREFERRED EMBODIMENTS

An embodiment of the present invention will be described hereinbelow with reference to the drawings as necessary.

FIGS. 1 to 7 are diagrammatical views for explaining a fundamental constitution of an embodiment of the present invention. Each of FIGS. 1 to 7 shows an example of the constitution of the liquid jet recording head and its manufacturing process according to a method of the embodiment. In this embodiment, the liquid jet recording head having two orifices is shown. The invention can also similarly be applied to a high density multiarray type liquid jet recording head having three or more orifices or to a liquid jet recording head having one orifice.

Figure 1:
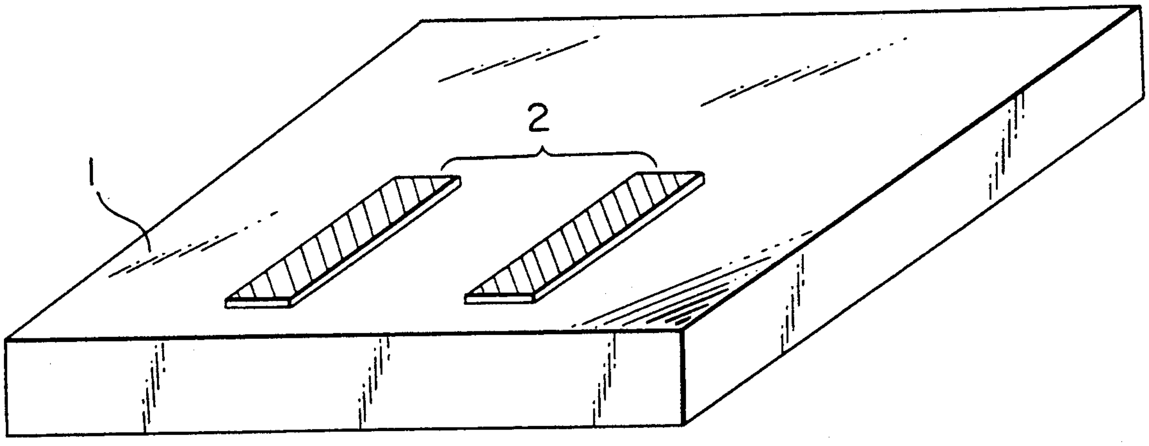

This embodiment uses two substrates which are made of, e.g., glass, ceramics, plastics, metal, or the like wherein at least one can transmit an active energy beam. FIG. 1 is a diagrammatical perspective view of an example of a first substrate 1 before a solid layer is formed.

Such a first substrate 1 functions as a liquid channel and as a part of a liquid chamber constituting material and also functions as a supporting member when a solid layer and an active energy beam hardening material are laminated as will be explained hereinafter. The first substrate 1 can transmit an active energy beam when irradiated with an active energy beam, which, as will be explained hereinafter, is performed from the side of the first substrate 1. However, in the other cases, the shape, material, and the like of the first substrate 1 are not limited. A desired number of liquid emission energy generating elements 2 (two elements 2 as shown in FIG. 1) such as electrothermal transducers, piezo-electric elements, or the like are disposed on the first substrate 1. An emitting energy to emit a recording liquid droplet is applied to a recording liquid by element 2 so that recording is performed. For example, when an electrothermal transducer is used as the liquid emission energy generating element 2, this transducer heats the recording liquid near the transducer, thereby generating the emitting energy. On the other hand, for example, when a piezo-electric element is used, the emitting energy is generated by the mechanical vibration of this element.

Each of those elements 2 is connected with a control signal inputting electrode (not shown) in order to make it operative. On the other hand, in general, various kinds of functional layers such as a protecting layer and the like are provided for the elements 2 in order to improve their durability and the like. It is apparent that no problem will be caused even if such functional layers are provided in the present invention.

Figure 3A:
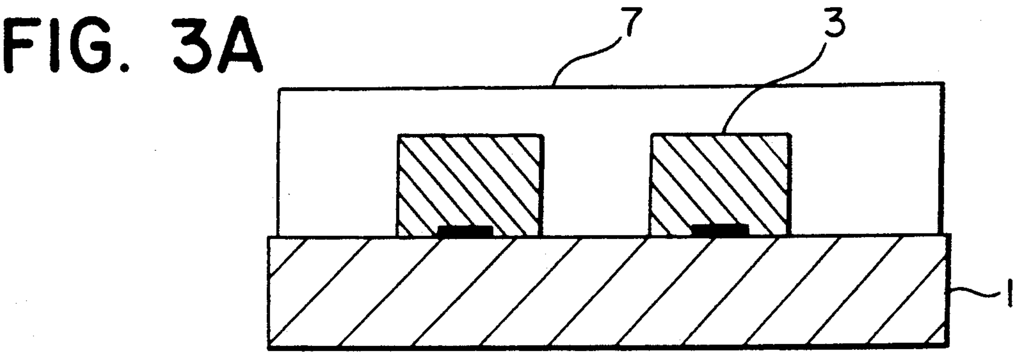
FIGS. 3(A) and 3(B) are diagrammatical cross sectional views of the first substrate after the solid layer and an active energy beam hardening material were laminated.

Next, solid layers 3 as shown in, e.g., FIG. 3(A) are laminated onto the liquid channel forming portion on the first substrate 1 including the elements 2 and onto the liquid chamber forming portion communicating with the liquid channel forming portion.

Figure 2A:
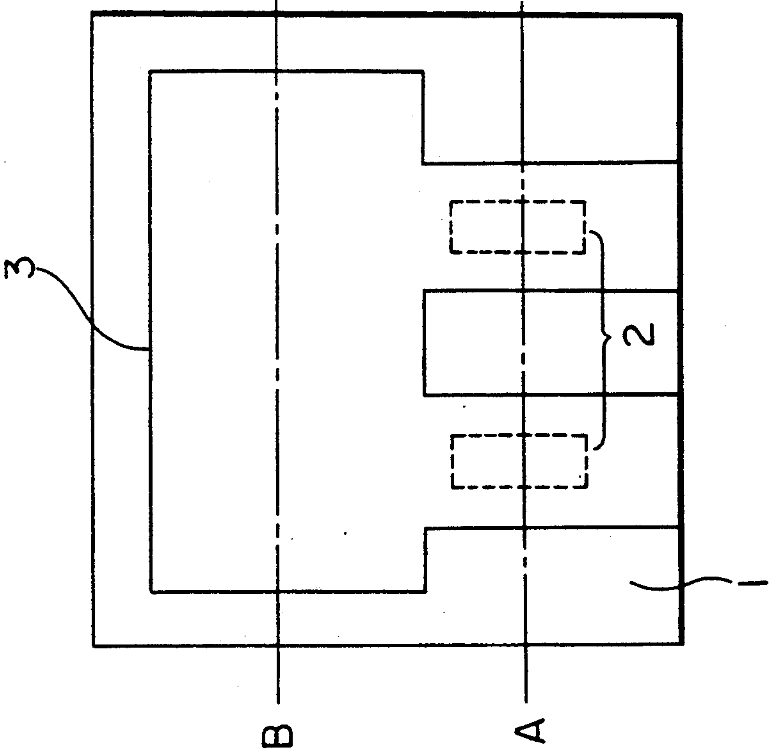
FIG. 2(A) is a diagrammatical plan view of the first substrate after the solid layer was formed.
Figure 2B:
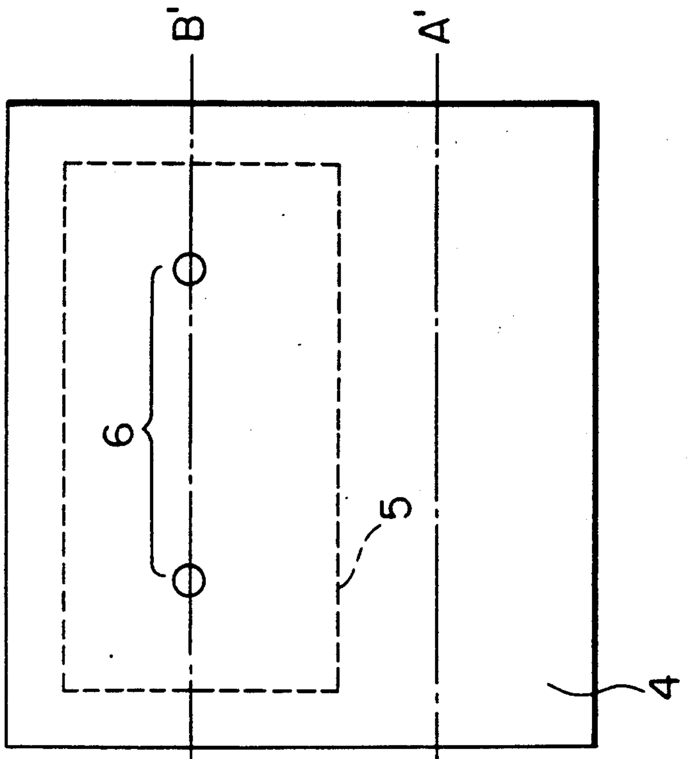
FIG. 2(B) is a diagrammatical plan view of the second substrate.

In the invention, it is not always necessary to laminate the solid layer onto both of the liquid channel and liquid chamber forming portions. It is sufficient to laminate the solid layer onto at least the liquid channel forming portion. FIG. 2(B) shows an example of the second substrate 4. In this example, a second substrate 4 has a concave portion 5 and two liquid supply ports 6 in the portions where a liquid chamber will be formed. Diagrams (A) in FIGS. 3 to 6 show diagrammatical cross sectional views of the first and second substrates taken along the line A–A' in FIGS. 2(A) and (B). Diagrams (B) in FIGS. 3 to 6 show diagrammatical cross sectional views of the first and second substrates taken along the line B–B' in FIGS. 2(A) and (B).

The solid layers 3 are removed after each process, which will be explained hereinafter, is executed. Thus, a liquid channel and a liquid chamber are formed in the portions where the solid layers 3 were removed. The liquid channel and liquid chamber can be formed into desired shapes and solid layer 3 can be also formed in accordance with the shapes of the liquid channel and liquid chamber. In this example, the liquid channel is distributed into two parts so that recording liquid droplets can be respectively emitted from two orifices which are formed in correspondence to two emission energy generating elements. The liquid chamber is communicated with each liquid channel so as to supply the recording liquid thereto.

As practical material and means which are used to form such solid layers 3, for example, such materials and means as will be explained hereinbelow can be mentioned.

(1) A photosensitive dry film is used to form the solid layers in accordance with the image forming process of what is called a dry film.

(2) A solvent soluble polymer layer and a photo resist layer which have desired thicknesses are laminated onto the substrate 1 in accordance with this order. After a pattern of the photo resist layer was formed, the solvent soluble polymer layer is selectively removed.

(3) A resin is printed.

As a photosensitive dry film mentioned in item (1), either a positive type film or a negative type film may be also used. For example, in the case of using a positive type dry film, it is suitable to use a positive type dry film which is soluble in a developing solution by the irradiation of an active energy beam. In the case of a negative type dry film, it is permissible to use a negative type dry film which is soluble or can be peeled off and removed by methylene chloride or strong alkali although this film is of the photopolymerizing type.

Practically speaking, for example, "OZATEC R225" (trade name, made by Höechst Japan Co., Ltd.) or the like may be used as a positive type dry film. On the other hand, "OZATEC T series" (trade name, made by Höechst Japan Co., Ltd.), "PHOTEC PHT series" (trade name, made by Hitachi Chemical, Co., Ltd.), "RISTON" (trade name, made by E. I. du Pont de Nemours & Company, Inc.), or the like may be used as a negative type dry film.

As well as those materials which are commercially available, the following compositions can be also similarly used: resin compositions which positively act, for example, resin compositions mainly consisting of naphthoquinone diozide derivative and a novblak type phenol resin; resin compositions which negatively act, e.g., compositions mainly consisting of acrylic oligomer which uses acrylic ester as a reactive radical, a thermoplastic high polymer compound, and a sensitizer; compositions consisting of polythiol, a polyene compound, and a sensitizer; or the like.

As a solvent soluble polymer mentioned in the item (2), it is possible to use any high polymer compound such that the solvent which can dissolve it exists and a coating film can be formed by a coating process. As a photoresist layer which can be used in this embodiment, the following layers can be typically mentioned: a positive type liquid photo resist consisting of novolak type phenol resin and naphthoquinone diozide; a negative type liquid photoresist consisting of a polyvinyl cinnamate; a negative type liquid photo resist consisting of a cyclized rubber and bis azide; a negative type photosensitive dry film; a thermosetting type and ultraviolet ray hardening type inks; and the like.

As a material to form the solid layer by the printing method mentioned in the item (3), it is possible to use a lithographic ink, a screen ink, a printing type resin, and the like which are used in each of the drying systems of, e.g., the evaporation drying type, thermosetting type, ultraviolet ray hardening type, and the like.

Among the foregoing groups of materials, using the photosensitive dry film mentioned in the item (1) is preferable in consideration of the working accuracy, ease of removal, working efficiency, and the like. Among them, it is particularly desirable to use the positive type dry film. Namely, for example, the positive type photosensitive material has such features that the resolution is superior to that of the negative type photosensitive material and the relief pattern can be easily formed so as to have the vertical and smooth side wall surface or the tapered or reverse tapered type cross sectional shape, and it is optimally forms the liquid channel. On the other hand, there are features such that the relief pattern can be dissolved and removed by a developing liquid or an organic solvent, and the like. The positive type photosensitive sensitive material is preferable as a material to form the solid layer in the invention. In particular, in the case of the positive type photosensitive material using, e.g., naphthoquinone diazide and novolak type phenol resin mentioned above, it can be completely dissolved by weak alkali aqueous solution or alcohol. Therefore, no damage is caused in the emission energy generating element and at the same time, this material can be extremely removed soon in the post process. Among the positive type photosensitive materials, the dry film shaped material is the most desirable material because its thickness can be set to 10 to 100 μm.

Figure 3B:
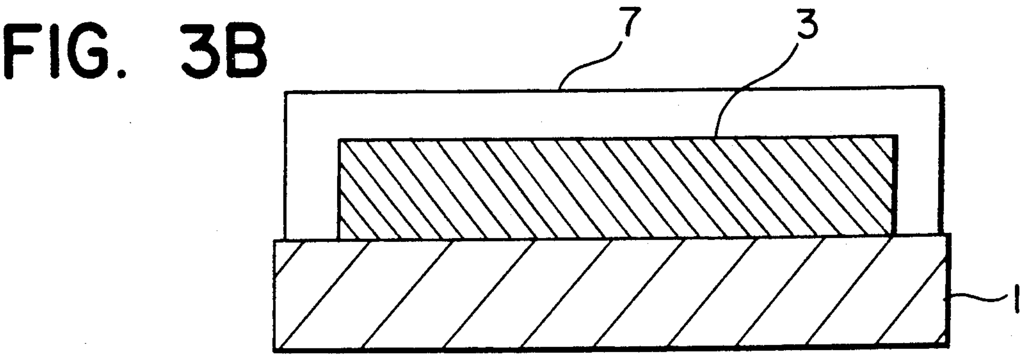

For example, as shown in FIGS. 3(A) and 3(B), an active energy beam hardening material layer 7 is laminated on the first substrate 1 formed with the solid layers 3 so as to cover the solid layers 3.

As an active energy beam hardening material, it is possible to preferably use any material which can cover the solid layers. However, since this material is used as a structural material serving as a liquid jet recording head by forming the liquid channel and liquid chamber, it is desirable to select and use a material which is excellent with respect to the adhesive property with the substrate, mechanical strength, dimensional stability, and corrosion resistance. As practical examples of such materials, active energy beam hardening liquid materials which are hardened by the ultraviolet rays and an electron beam are suitable. Among them, there is used epoxy resin, acrylic resin, diglycol dialkyl carbonate resin, unsaturated polyester resin, polyurethane resin, polyimide resin, melamine resin, phenol resin, urea resin, or the like. In particular, the epoxy resin which can start the cationic polymerization by the light, acrylic oligomer group having an acrylic ester which can radical polymerize by the use of light, photo addition polymerization type resin using polythior and polyene, unsaturated cycloacetal resin, and the like are suitable as a structural material since the polymerizing speed is high and the physical property of the polymer is also excellent.

As a practical method of laminating the active energy beam hardening material, for example, it is possible to laminate it by the means such as discharge instrument using a nozzle of the shape according to the shape of the substrate, applicator, curtain coater, roll coater, spray coater, spin coater, or the like. When a liquid hardening material is laminated, it is preferable to laminate it so as to avoid the mixture of air bubbles after such material was degasified.

Figure 4A:
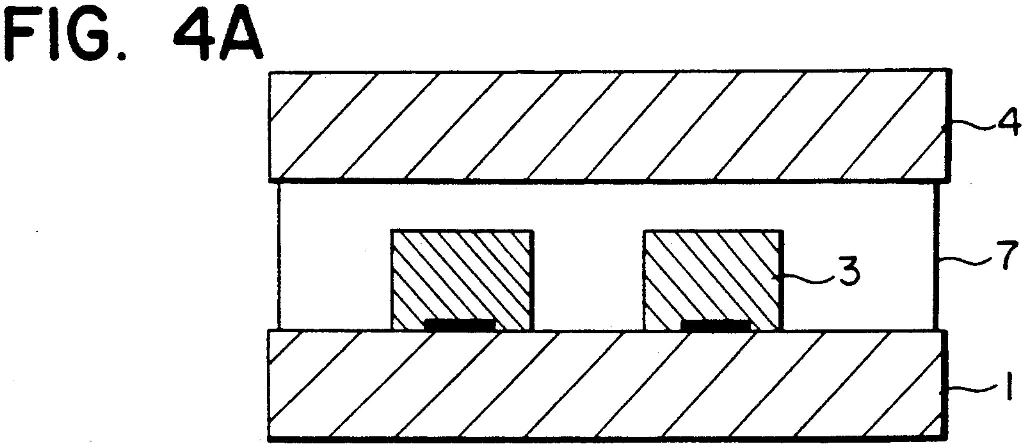
FIGS. 4(A) and 4(B) are diagrammatical cross sectional views of the laminate after the second substrate was laminated.
Figure 4B:
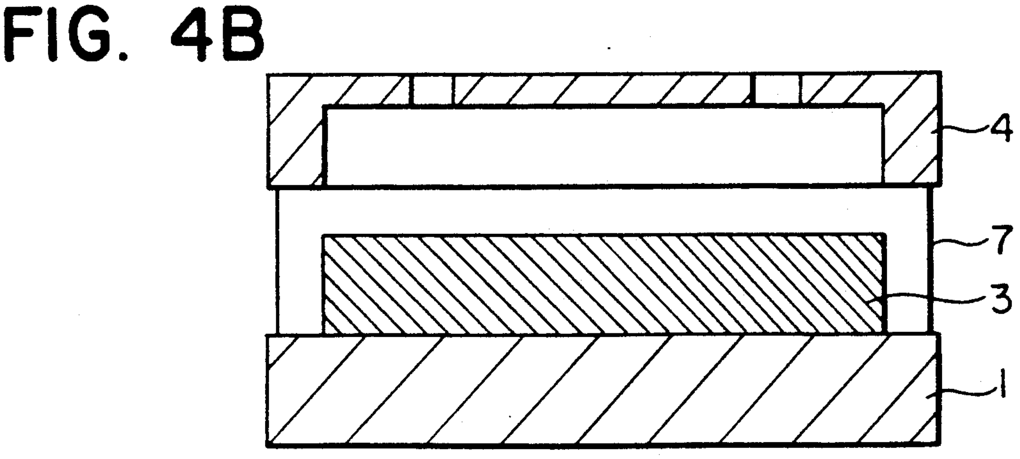

Next, the second substrate 4 is laminated onto the active energy beam hardening material layer 7 on the first substrate 1 as shown in FIGS. 4(A) and 4(B). In this case, a concave portion adapted to obtain a desired volume of the liquid chamber may be also formed in the portion of the liquid chamber forming portion of the second substrate 4 as necessary. Similarly to the first substrate 1, a desired material such as glass, plastic, photosensitive resin, metal, ceramics, or the like may be also used as the second substrate 4. However, in the case of performing the process to irradiate an active energy beam from the side of the second substrate 2, the active energy beam needs to be transmitted. In addition, a port to supply a recording liquid may be also previously formed in the second substrate 4.

Although not shown in the above description, the active energy beam hardening material layer 7 may also be laminated after the second substrate was laminated onto the solid layer. As a laminating method in this case, it is desirable to use a method whereby after the second substrate 4 was pressure adhered to the first substrate 1, the inside pressure is reduced and then the hardening material is injected, or the like. On the other hand, when the second substrate 4 is laminated, in order to set the thickness of the layer 7 to a desired value, it is also possible to use a method whereby, for example, a spacer is sandwiched between the first and second substrates, a convex portion is formed at the edge of the second substrate 4, or the like.

Figure 5A:
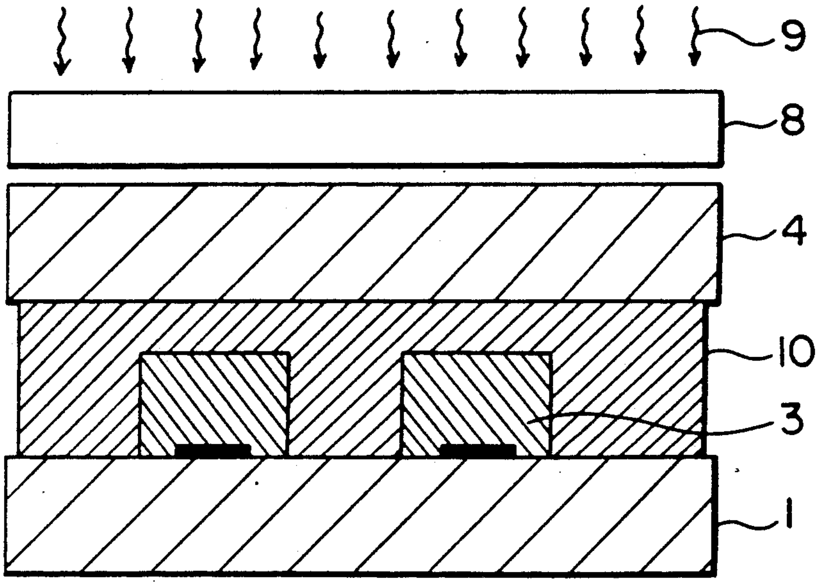
FIGS. 5(A) and 5(B) are diagrammatical cross sectional views of the laminate after a mask was laminated.
Figure 5B:
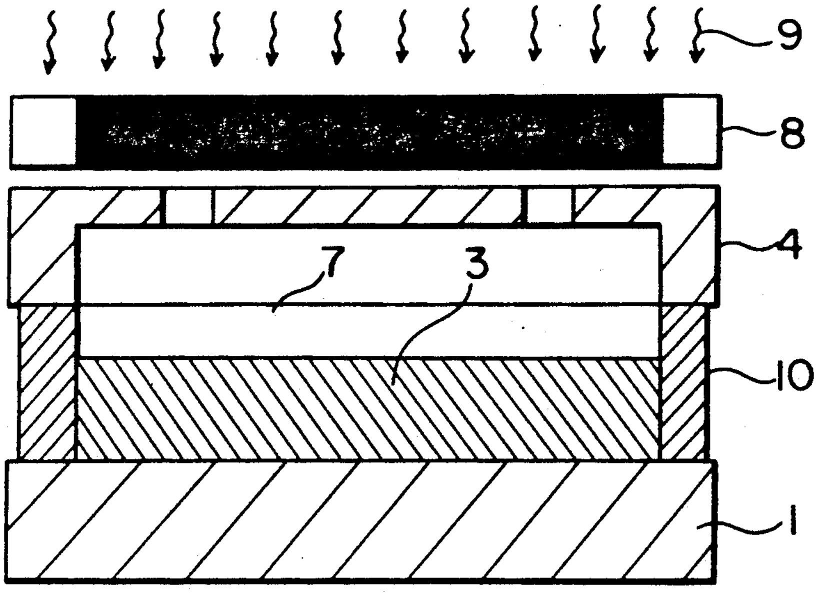

In this manner, the first substrate, solid layer, active energy beam hardening material layer, and second substrate are sequentially laminated to form a single laminate. Thereafter, as shown in FIGS. 5(A) and 5(B), a mask 8 is laminated onto the side of the substrate capable of transmitting the active energy beam (in this example, the second substrate 4) so as to shield the liquid chamber forming portion from an active energy beam 9. Then, the active energy beam 9 is irradiated from above the mask 8 (the black area in the mask 8 shown in FIG. 8(B) does not transmit the active energy beam and the area other than the black area can transmit the active energy beam). By irradiating the active energy beam 9, the active energy beam hardening material (the hatched portion indicated at reference numeral 10 in the diagram) corresponding to the irradiated portion is hardened, so that the hardened resin layer is formed. At the same time, the first and second substrates 1 and 4 are joined by this hardening.

Ultraviolet rays, electron beam, visible rays, or the like can be used as an active energy beam. However, since the exposure is performed by transmitting the active energy beam through the substrates, the ultraviolet rays and the visible rays are preferable. The ultraviolet rays are the most suitable in terms of the polymerizing speed. As a source for emitting ultraviolet rays, it is desirable to use the light beam having a high energy density, such as high pressure mercury lamp, extra-high pressure mercury lamp, halogen lamp, xenon lamp, metal halide lamp, carbon arc, or the like. As the light beam emitted from the light source is highly parallel and as its heat generation is low, the working accuracy becomes high. However, it is possible to use an ultraviolet ray light source which is generally used for the print photoengraving, working of a printed wiring board, and hardening of a light hardening type coating material.

As a mask for the active energy beam, in particular, in the case of using the ultraviolet rays or visible rays, it is possible to use a metal mask, an emulsion mask of silver salt, a diazo mask, or the like. Further, it is also possible to use a method whereby a black ink layer is merely printed to the liquid chamber forming portion, or a seal is merely adhered thereto, or the like.

For example, when the edge surface of the orifice is not exposed, or the like, the laminate after it was hardened by the irradiation of the active energy beam is cut at a desired position as necessary by a dicing saw or the like using a diamond blade, thereby exposing the orifice edge surface. However, such a cutting is not always necessary to embody the present invention. The cutting work is unnecessary in the case where, for example, a liquid hardening material is used, a die is used when this material is laminated, the orifice edge portion is smoothly molded without closing and covering the orifice edge portion, or the like.

Figure 6A:
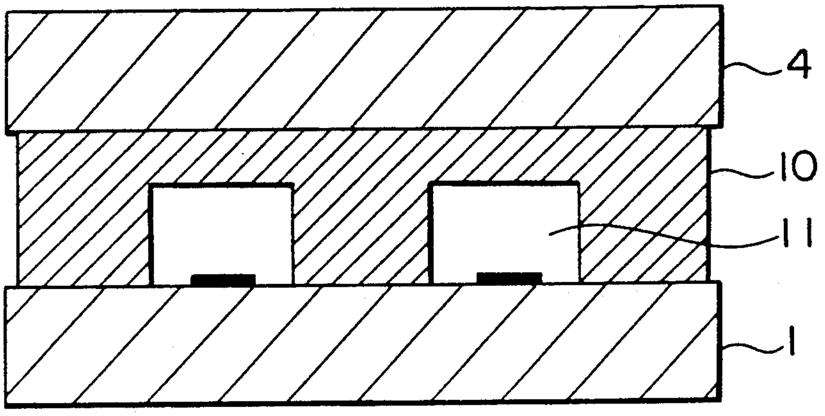
Figure 6:
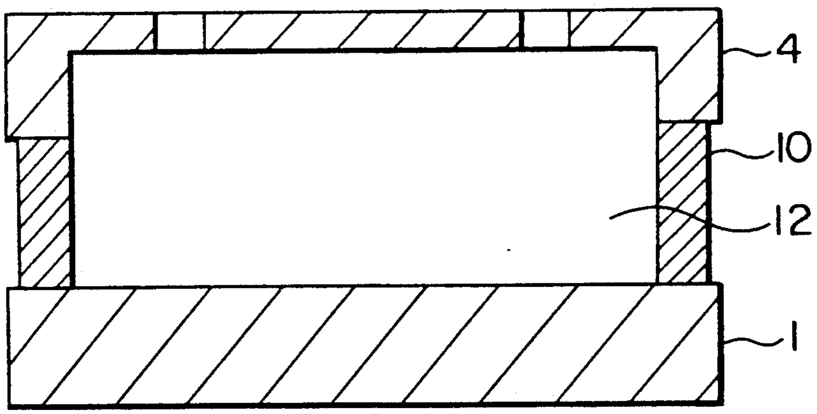

Next, as shown in FIGS. 6(A) and 6(B), the solid layer 3 and the material 7 which is not yet hardened are removed from the laminate after completing the irradiation of the active energy beam, thereby forming a liquid channel 11 and a liquid chamber 12. In this invention, the active energy beam is not irradiated onto the material 7 in the liquid chamber forming portion but the material 7 is removed in the unhardened state. Therefore, the liquid chamber can be formed independently of the liquid channel by arbitrarily controlling the thickness of layer of the material 7 which is laminated onto the solid layer.

The means for removing the solid layer 3 and the hardening material 7 is not limited in particular. However, practically speaking, it is preferable to use a method whereby, for example, the solid layer 3 and the hardening material in the unhardened state are dipped into a liquid which is selected to dissolve, swell, or peel them, thereby removing them, or the like. In this case, it may also be necessary to use the removal promoting means such as ultrasonic wave process, spray, heating, stirring, shaking, pressure circulation, or the like.

As a liquid which is used for the above removing means, it it possible to use, for example, halogen containing hydrocarbon, ketone, ester, aromatic hydrocarbon, ether, alcohol, N-methyl pyrolidone, dimethyl formamide, phenol, water, water containing acid or alkali, or the like. A surface active agent may be also added to these liquids as necessary. On the other hand, when a positive type dry film is used as a solid layer, it is desirable to again irradiate the ultraviolet rays to the solid layer so as to make the removal easy. In the case of using other material, it is preferable to heat the liquid to a temperature within a range of 40° to 60° C.

FIGS. 6(A) and 6(B) show the state after the solid layer 3 and the active energy beam hardening material 7 in the unhardened state were removed. However, in the case of this example, the solid layer 3 and the unhardened material 7 are dipped into the liquid adapted to dissolve them and are dissolved and removed through the orifice of the head and the liquid supply port 6.

Figure 7:
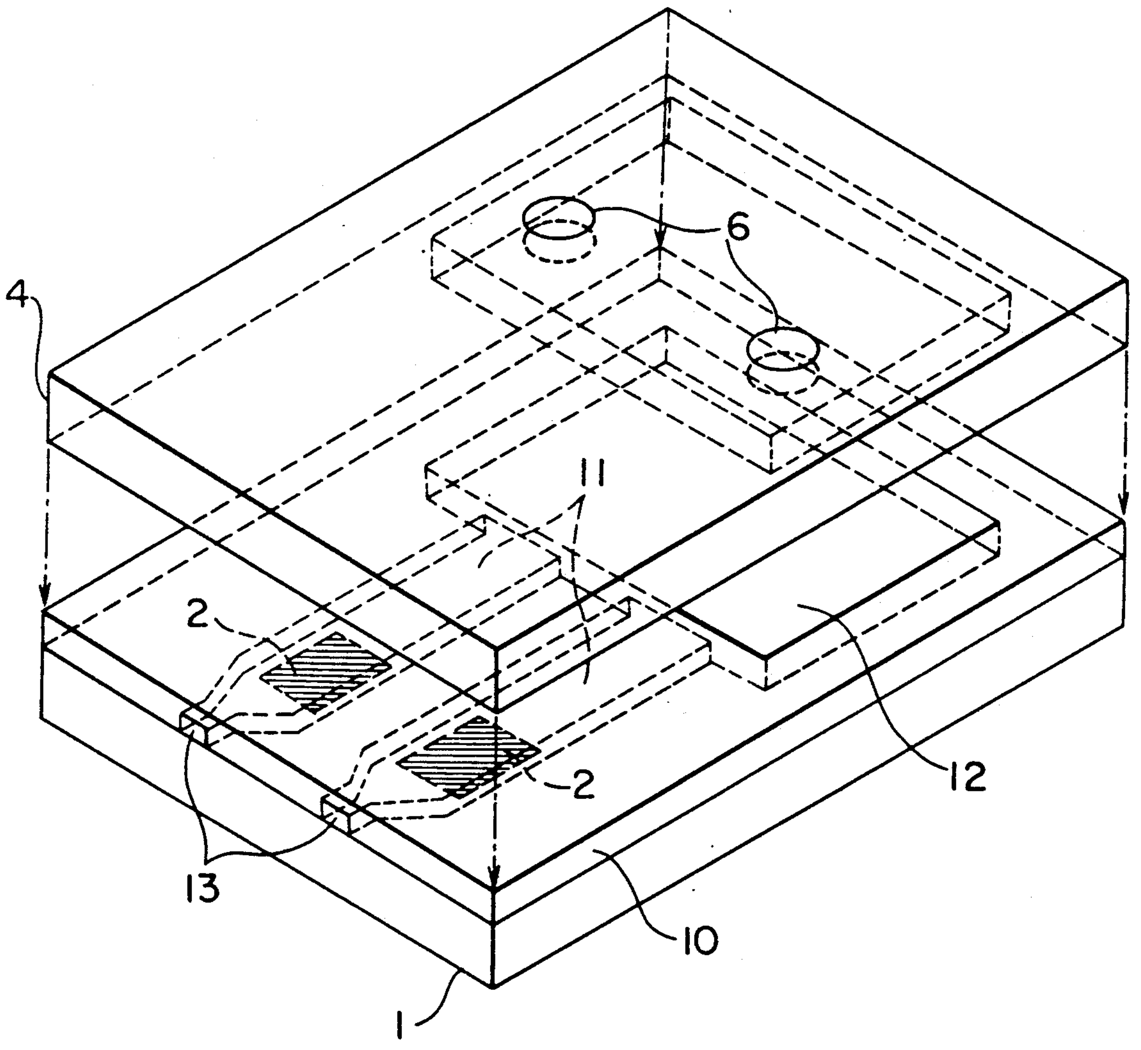

FIG. 7 shows a diagrammatical perspective view of the liquid jet recording head obtained by the foregoing processes. After completion of the above processes, in order to optimize the interval between the liquid emission energy generating element 2 and an orifice 13, the orifice edge may also be cut, polished, or smoothed as necessary.

The industrial values of the method of manufacturing the liquid jet recording head of the invention will be summarized as follows.

(1) The accurate working can be performed.

(2) A limitation on working of the shapes of the liquid channel and liquid chamber is small.

(3) No particular experience is required for working and the high mass productivity is obtained.

(4) A selectable range of the active energy beam hardening material is wide, so that the material having the excellent function can be used as a structural material.

(5) The liquid jet recording head can be cheaply manufactured.

(6) The large liquid chamber which is required for the recording head of the high density multiarray type can be easily formed, and the working processes are both easy suitable for mass production.

EXAMPLES

The present invention will be further described in detail hereinbelow with respect to examples.

EXAMPLE 1

The liquid jet recording head with the constitution of FIG. 7 was made in accordance with the manufacturing procedure shown in FIGS. 1 to 6.

First, an electrothermal transducer (made of $HfB_2$) as a liquid emission energy generating element was formed on a glass substrate (having a thickness of 1.1 mm) as a first substrate. Then, a photosensitive layer having a thickness of 50 μm consisting of a positive type dry film "OZATEC R225" (made by Höechst Japan Co., Ltd.) was laminated onto the first substrate. A mask of a pattern as shown in FIG. 7 was overlaid onto the photo sensitive layer. The ultraviolet rays of 70 $mJ/cm^2$ were irradiated to the portion excluding the portions where a liquid channel and a liquid chamber will be formed. The length of liquid channel was set to 3 mm.

Next, the spray development was performed using a sodium metasilicate aqueous solution of 5%. A relief solid layer having a thickness of about 50 μm was formed in the liquid channel and liquid chamber forming portions on the glass substrate including the electrothermal transducer.

Three substrates on each of which the solid layer had been laminated were formed in accordance with the operating procedure similar to the above. Active energy beam hardening liquid materials shown in Table 1 were laminated onto the substrates formed with the solid layers. The operating procedure was as follows.

Each of the active energy beam hardening materials of A to C in Table 1 was mixed to the catalyst and was defoamed using a vacuum pump. Thereafter, the three defoamed materials were coated on the first substrates on which the solid layers had been laminated so as to have thicknesses of 70 μm from the upper surfaces of the substrates by using the applicator.

Next, a glass substrate as a second substrate having a thickness of 1.1 mm was laminated onto each of the first substrates on which the foregoing three kinds of active energy beam hardening materials had been laminated in accordance with the position of the liquid chamber forming portion. Each of the glass substrates has a concave portion of a depth of 0.3 mm in the liquid chamber forming portion and a through hole (liquid supply port) to supply the recording liquid at the center of the concave portion.

Subsequently, a film mask was adhered onto the upper surface of the second substrate of the laminate. The light beams were irradiated from the above of the liquid chamber forming portion by the extra-high pressure mercury lamp "UNIARC (trade name)" (made by Ushio Inc.) by shielding the liquid chamber forming portion against the active energy beam. At this time, the integrated intensity of lights near 365 nm was 1000 $mW/cm^2$. Next, the film mask was removed and the orifice was cut such that the electrothermal transducer is located at the position away from 0.7 mm from the orifice edge, thereby forming the orifice edge surface.

The three laminates having the exposed orifice edge surfaces were each dipped into ethanol. Ethanol was filled in the liquid chamber. The dissolving and removing process was executed in the ultrasonic cleaner for about three minutes in the state in which the orifice edge surfaces are in contact with ethanol. After completion of the dissolution and removal, the cleaning was performed using an NaOH aqueous solution of 5% and pure water. Thereafter, those laminates were dried and exposed at the rate of 10 $J/cm^2$ by use of the high pressure mercury lamp. In this way, the active energy beam hardening materials were completely hardened.

The residue of the solid layer did not exist at all in any of the liquid channels of the three liquid jet recording heads which had been made as described above. Further, these heads were attached to the recording apparatus and the recording was executed using an ink for ink jet consisting of pure water/glycerol/direct black 154 (water-soluble black dye) at 65/30/5 (weight parts), so that the printing could be stably performed. The height of the liquid channel of the resultant recording head was about 50 μm and the height of the liquid chamber was about 0.37 mm.

EXAMPLE 2

A multihead having 3600 liquid channels was manufactured in accordance with the manufacturing procedure shown in FIGS. 1 to 6. The dimensions of the liquid channels were set such that the interval between the liquid channels was 130 μm, the width of liquid channel was 45 μm, and the height of liquid channel was 50 μm. In accordance with the procedure similar to the Example 1, the glass substrate having a thickness of 1.1 mm was used as a first substrate. The active energy beam hardening material of A in Table 1 was used as an active energy beam hardening material. The material of A in Table 1 was laminated so as to have a thickness of 0.8 mm by use of polyester of a thickness of 0.3 mm as a base. A concave portion of a depth of 0.8 mm was formed in the liquid chamber forming portion by the exposure and development. A liquid supply port was formed in this portion. The resultant substrate was used as the second substrate. The other conditions were the same as those in the Example 1. In this manner, a liquid jet recording head was made. The height of liquid chamber was about 0.87 mm.

With respect to the resultant liquid jet recording head, a variation in cross sectional dimensions of the orifices of 100 of the 3600 liquid channels was measured. Thus, the variation in dimensions was very small. Next, the resultant liquid jet recording head was attached to the recording apparatus and the recording tests were executed. As a recording liquid, pure water/diethylene glycol/direct black 154 at 65/30/5 (weight parts) was used. By adding KOH, pH of this recording liquid was adjusted to 10.8.

The tests of the printing and photoprinting were executed for the paper of the A4 size. Thus, the emission can be stably performed at a high speed. As the result of the observation of the recording head after completion of the recording tests, none of the deformation, peeling, and the like occured in the liquid channels. The good durability was obtained.

TABLE 1

| Symbol | Resin | Trade Name | | Catalyst | Name of Maker of the Resin |
|---|---|---|---|---|---|
| A | Epoxy resin | Cyvacure UVR-6110 | 40 parts | Triphenyl honium | Japan Union |
| | | Cyvacure UVR-6200 | 20 parts | hexafluoro- | Carbide Co., |
| | | Cyvacure UVR-6351 | 40 parts | antimonate *1 | Ltd. |
| B | Acrylic resin | Photomer 4149 | 50 parts | Benzil dimethyl | Sannopuco |
| | | Photomer 3016 | 50 parts | ketal *2 | Co., Ltd. |
| C | Unsaturated cycloacetal | Spirac | T-500 | Benzophenone *3 | Showa High Polymer |

TABLE 1-continued

| Symbol | Resin | Trade Name | Catalyst | Name of Maker of the Resin |
|---|---|---|---|---|
| | resin | | | Co., Ltd. |

*1 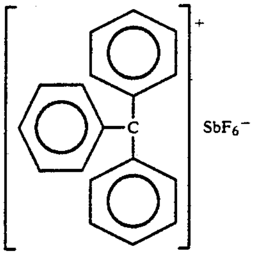

*2 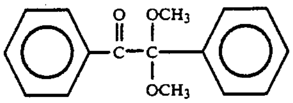

*3 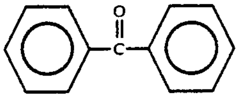

According to the foregoing embodiment, the following effects are obtained.

(1) The main process to manufacture the head is performed on the basis of what is called a printing technique, i.e., a fine processing technique using a photoresist, a photosensitive dry film or the like. Therefore, the fine portion of the head can be very easily formed to a desired pattern and a number of heads with the same constitution can be simultaneously manufactured.

(2) As a head constituting material, it is possible to use a material such that no influence is exerted on both of this material and the recording liquid using an aqueous solution which is not the neutrality or an organic solvent as a medium and that the adhesive property, mechanical strength, and the like are excellent. Therefore, the durability of reliability as a recording apparatus can be raised.

(3) The number of manufacturing steps is small and good producing efficiency is derived.

(4) The main component parts can be easily certainly positioned. The heads having the high dimensional accuracy can be obtained with an excellent yield.

(5) The high density multiarray liquid jet recording head is obtained by a simple method.

(6) The thickness of groove wall constituting a liquid channel can be fairly easily adjusted. A liquid channel of a desired dimension (e.g., depth of groove) can be formed in accordance with the thickness of solid layer.

(7) The continuous mass production can be realized.

(8) Since there is no need to use an etching liquid (strong acid group such as hydrofluoric acid or the like) in particular, the invention is also excellent in terms of the safety and hygiene.

(9) Since there is no need to use an adhesive agent in particular, the occurrence of the deterioration of function because an adhesive agent flows into and obstructs a groove or an adhesive agent is adhered to the liquid emission energy generating element is prevented.

(10) The liquid chamber can be freely formed.

What I claim is:

1. A method of manufacturing an ink jet recording head comprising the steps of:

(a) filling a concave portion of a concave and convex member having concave and convex portions for forming an ink passage communicating with an orifice for discharging ink with a filler capable of changing its hardness upon receiving active energy irradiation;

(b) covering said concave and convex portions with a substrate;

(c) selectively irradiating a portion of said filler with said active energy; and (d) removing the convex portion of said concave and convex member and a portion of said filler having a hardness less than another portion of said filler, to thereby form said ink passage.

2. A method according to claim 1, wherein said concave and convex member is formed of an organic high polymer material.

3. A method according to claim 2, wherein said organic high polymer material is a positive type photosensitive resin.

4. A method according to claim 1, wherein said step (c) is conducted using a mask.

5. A method according to claim 1, wherein said ink passage has a ink channel connected to said orifice and a liquid chamber connected to said ink channel and in step (c), said liquid chamber forming portion is not irradiated with said active energy.

6. A method according to claim 1, wherein after said step (c) and before said step (d), cutting a laminate comprising said concave and convex member, said filler and said substrate to form said orifice.

7. A method according to claim 1, wherein after said step (d) a step for cutting a surface portion at which said orifice is provided.

8. A method according to claim 1, wherein after said step (d), a step for polishing the surface portion at which said orifice is provided.

9. A method according to claim 1, wherein after said step (d), a step for smoothing a surface portion at which said orifice is provided.

10. A method according to claim 1, wherein said step (d) is conducted by subjecting a laminate comprising said concave and convex member, said filler and said substrate to a liquid.

11. A method according to claim 1 wherein said step (d) is conducted by subjecting a laminate comprising said concave and convex member, said filler and said substrate to a liquid with ultrasonic processing.

12. A method according to claim 1, wherein said step (d) is conducted by subjecting a laminate comprising said concave and convex member, said filler and said substrate to a liquid and by heating said laminate.

13. A method according to claim 1, wherein said step (d) is conducted by subjecting a laminate comprising said concave and convex member, said filler and said substrate to a liquid and by stirring the liquid.

14. A method according to claim 1, wherein said step (d) is conducted by subjecting a laminate comprising said concave and convex member, said filler and said substrate to a liquid and by vibrating said laminate.

15. A method according to claim 1, wherein said step (d) is conducted by subjecting a laminate comprising said concave and convex member, said filler and said substrate and by compressively circulating a liquid.

16. A method according to claim 1, wherein after said step (c) and before said step (d), irradiating with a light convex portion of said concave and convex member.

17. A method according to claim 1, wherein in step (a) burying said convex portion of said concave and convex member in said filler.

18. A method according to claim 1, wherein said ink passage has a ink channel connected to said orifice and a ink chamber connected to the ink channel; and said concave and convex member has a convex portion at a portion constituting the liquid channel and also at a portion constituting said liquid chamber.

19. A method according to claim 1, wherein said ink passage has a ink channel connected to said orifice and a ink chamber connected to said ink channel; and said concave and convex member has a convex portion only at a portion constituting said ink channel.

20. A method according to claim 1, wherein said concave and convex member comprises a second substrate and a patterned solid layer upon said second substrate.

21. A method according to claim 20, wherein said second substrate is made of an active energy transmitting material.

22. A method according to claim 20, wherein said patterned solid layer is a resin.

23. A method according to claim 22, wherein said resin has a photosensitive property.

24. A method according to claim 1, wherein said resin is a positive type photosensitive resin.

25. A method according to claim 22, wherein said resin is negative type photosensitive resin.

26. A method according to claim 22, wherein said resin is soluble in a halogen-containing hydrocarbon, ketone, ester, aromatic hydrocarbon, ether, alcohol, N-methylpyrrolidone, dimethyl formamide, phenol, water, water containing an acid or water containing an alkali, or combination thereof.

27. A method according to claim 1, wherein said filler is liquid prior to irradiation.

28. A method according to claim 1, wherein said filler is hardened by using an ultraviolet hardening material.

29. A method according to claim 1, wherein said filler is hardened by using electron beam hardening material.

30. A method according to claim 1, wherein said filler is hardened by using visible light hardening material.

31. A method according to claim 1, wherein said substrate has a concave portion.

32. A method according to claim 1, wherein said substrate has an ink supplying opening.

33. A method according to claim 1, wherein said substrate is formed by using an active energy transmitting material.

34. A method according to claim 1, wherein a plurality of said orifices are provided.

35. A method according to claim 1, wherein at said ink passage, an energy generating body producing an energy for use in emitting an ink is provided.

36. A method according to claim 35, wherein said energy generating body generates heat.

37. A method according to claim 35, wherein said energy generating body is an electric-heat converter.

38. A method according to claim 35, wherein said energy generating body is a piezo-electric element.

39. A method according to claim 1, wherein said step (a) is conducted by reducing a pressure between said concave and convex member and said substrate, and by injecting a filler therebetween.

40. A method according to claim 1, wherein said hardness of said filler refers to its solubility in a solvent.

41. A method according to claim 1, wherein a convex portion is formed at an edge of said substrate.

42. A method according to claim 1, wherein said concave and convex member are supported by a substrate, and a spacer is provided between said substrates.

* * * * *

UNITED STATES PATENT AND TRADEMARK OFFICE
CERTIFICATE OF CORRECTION

PATENT NO. : 5,030,317

DATED : July 9, 1991

INVENTOR(S) : HIROMICHI NOGUCHI

It is certified that error appears in the above-identified patent and that said Letters Patent is hereby corrected as shown below:

ON THE TITLE PAGE,
IN [63] RELATED U.S. APPLICATION DATA

Insert --Continuation of Ser. No. 177,833, March. 24, 1988--.

COLUMN 1

Line 6, "No. 038.766," should read --No. 177,833, filed Mar. 24, 1988, which is a continuation of application Ser. No. 038,766,--.
Line 60, "effect" should read --affect--.

COLUMN 4

Line 13, "also" should be deleted.
Line 59, "diozide" should read --diazide-- and "novblak" should read --novolak--.

COLUMN 5

Line 4, "photo resist" should read --photoresist--.
Line 5, "diozide;" should read --diazide;--.
Line 7, "photo resist" should read --photoresist--.
Line 28, "is" should be deleted.
Line 67, "radical" should be deleted.
Line 68, "polythior" should read --polythiol--.

COLUMN 6

Line 53, "8(B)" should read --5(B)--.
Line 55, "irradiating the" should read --irradiating with the--.

UNITED STATES PATENT AND TRADEMARK OFFICE
CERTIFICATE OF CORRECTION

PATENT NO. : 5,030,317

DATED : July 9, 1991

INVENTOR(S) : HIROMICHI NOGUCHI

It is certified that error appears in the above-identified patent and that said Letters Patent is hereby corrected as shown below:

COLUMN 7

Line 54, "it it" should read --it is--.
Line 56, "N-methyl pyrolidone," should read --N-methyl pyrrolidone,--.

COLUMN 8

Line 29, "easy suitable" should read --easy and suitable--.
Line 34, "EXAMPLE 1" should be centered heading.
Line 45, "photo" should read --photo- --.

COLUMN 11

Line 42, "of" should read --or--.

COLUMN 12

Line 50, "a" should read --an--.
Line 59, "step (d)" should read --step (d),--.

COLUMN 13

Line 28, "(a) burying" should read --(a),--.
Line 29, "member" should read --member is buried--.
Line 31, "a" should read --an--.
Line 32, "a" should read --an--.
Line 34, "liquid channel" should read --ink channel--.
Line 35, "liquid chamber." should read --ink chamber.--.
Line 37, "a" should read --an--.
Line 38, "a" should read --an--.

UNITED STATES PATENT AND TRADEMARK OFFICE

CERTIFICATE OF CORRECTION

PATENT NO. : 5,030,317

DATED : July 9, 1991

INVENTOR(S) : HIROMICHI NOGUCHI

It is certified that error appears in the above-identified patent and that said Letters Patent is hereby corrected as shown below:

COLUMN 14

Line 3, "claim 1," should read --claim 22,--.
Line 18, "using electron" should read --using an electron--.
Line 20, "using visible" should read --using a visible--.

Signed and Sealed this

Tenth Day of December, 1991

Attest:

HARRY F. MANBECK, JR.

*Attesting Officer*

*Commissioner of Patents and Trademarks*